United States Patent [19]

Therrien et al.

[11] Patent Number: 4,990,942

[45] Date of Patent: Feb. 5, 1991

[54] PRINTER RF LINE CONTROL

[75] Inventors: Roger H. Therrien, Hanover, Mass.; John R. Rumsey, Oxnard, Calif.

[73] Assignee: Delphax Systems, Randolph, Mass.

[21] Appl. No.: 504,541

[22] Filed: Apr. 4, 1990

[51] Int. Cl.[5] .............................................. G01D 15/06

[52] U.S. Cl. ....................................... 346/155; 346/159

[58] Field of Search ........................ 346/154, 155, 159

[56] References Cited

U.S. PATENT DOCUMENTS

| | | | |
|---|---|---|---|
| 4,160,257 | 7/1979 | Carrish | 346/159 |
| 4,628,227 | 12/1986 | Briere | 346/159 X |
| 4,719,481 | 1/1988 | Tuan et al. | 346/159 |
| 4,841,313 | 6/1989 | Weiner | 346/159 |
| 4,891,656 | 1/1990 | Kubelik | 346/159 X |

*Primary Examiner*—George H. Miller, Jr.

*Attorney, Agent, or Firm*—Lahive & Cockfield

[57] ABSTRACT

An improved controller for a printhead having crossed first and second sets of electrodes determines whether any electrode of the second set is to be activated, and disables an electrode of the first set if it determines that no second electrode is active. By reducing the number of times the first electrodes are actuated printhead life and print quality are improved. In one embodiment, the controller ORs the second electrode control signals to develop an output which enables the first electrodes.

6 Claims, 5 Drawing Sheets

PRINTER RF LINE CONTROL

BACKGROUND OF THE INVENTION

The present invention relates to electrographic printers of the type wherein a printhead array generates charge carriers and directs them at a recording or imaging member by the selective activation of crossed (e.g., row and column) electrodes. It is particularly directed to such printers wherein the printhead array is a wide array that is substantially the width of an image line, and wherein one set of electrodes is activated with a voltage to function as a source of charge carriers which are extracted by activation of electrodes of the other set.

Printheads of this type are described in U.S Pat. No. 4,160,257, U.S. Pat. No. 4,628,227, and others. In the printheads described more particularly in the aforesaid patents, a set of high voltage electrodes are activated with an RF frequency signal of several thousand volts amplitude to create a localized corona or glow discharge region, and one or more control electrodes located at or near the discharge region are activated in a synchronized manner with lesser control voltages to gate positive or negative charge carriers from the region, thus depositing latent image charge dots on a dielectric imaging member moving past the printhead.

In printing devices using this type of printhead, the RF driven corona generation lines extend along the width of the printhead, spanning many of the control electrodes, which cross them at an angle. One commercial embodiment, by way of example, has twenty parallel RF lines, which are crossed by one hundred twenty eight oblique control electrodes, known as finger electrodes. During the time when one RF line is activated, by a burst of about ten cycles of a one to three MHz drive signal at approximately 2700 volts peak to peak amplitude, those finger electrodes which cross that RF line at the desired dot locations are activated to deposit charge dots.

In the conventional drive circuitry for such systems, the RF drive lines are actuated in a fixed sequence independently of the image being printed. During any given RF line actuation, the number of finger electrodes which are actuated varies in accordance with the Pattern being printed. When the printer is used to print text, the spaces between lines, amounting to approximately fifty percent of the page, remain blank and no finger electrodes are actuated as the corresponding region of the latent imaging belt or drum passes the RF electrodes. In this case, even without any finger actuations, the RF lines continue to be actuated.

The repetitive actuation of the printhead structure with the RF signal, which is applied between electrodes separated by a thin dielectric layer, ultimately leads to localized breakdown or failure of the dielectric material. It also forms atmospheric reaction products and residues which can erode the physical structures of, or impair the operation of, the outermost electrodes and the electrode cavity structures.

In addition, the repetitive actuation of the RF electrodes is the major factor affecting the lifetime of the circuitry for driving the RF electrodes.

Accordingly, it would be desirable to reduce the degradation caused by repetitive RF line actuation.

SUMMARY OF THE INVENTION

It is an object of the invention to reduce the number of electrode actuations in a printing apparatus of the above described type.

It is another object of the invention to improve the longevity of printheads and circuitry in printing apparatus of the above described type.

It is another object of the invention to improve long-term printing quality of printing apparatus of the above described type.

These ends achieved in accordance with the present invention by providing a circuit which, for any charge deposition cycle in which a given RF line is due to be actuated, determines whether any finger electrodes are to be actuated for that RF line, and if none are to be actuated, disables the RF line. In one embodiment adapted to a prior art printing apparatus, the circuit receives the RF line enable and finger electrode selection signals which are intended for the RF line driver and finger electrode driver circuits, resPectively, of the device, and generates a substitute RF line enable signal which is passed only when at least one finger selection signal has been detected. A logic circuit receives successive groups of the finger selection signals, to develop output signals which are latched and passed to a gate for controlling the original RF line enable signal. The RF line enable signal is therefore passed to the RF line driver only when actuation of the line is required for printing.

This greatly reduces the number of RF line actuations, so that the printhead and associated driving circuitry are subjected to substantially fewer charging cycles, thereby prolonging their lifetimes. In addition, the appearance of certain subcritical defects which appear later in the printhead lifetime, such as the "black holes" which eventually affect operation at lower atmospheric pressures, is pushed back to a later point in the life cycle of that component.

BRIEF DESCRIPTION OF DRAWINGS

These and other features of the invention will be understood from the detailed description which follows, read in light of the constructions known in the art and the illustrations of exemplary embodiments wherein.

DETAILED DESCRIPTION OF INVENTION

Figure 1:
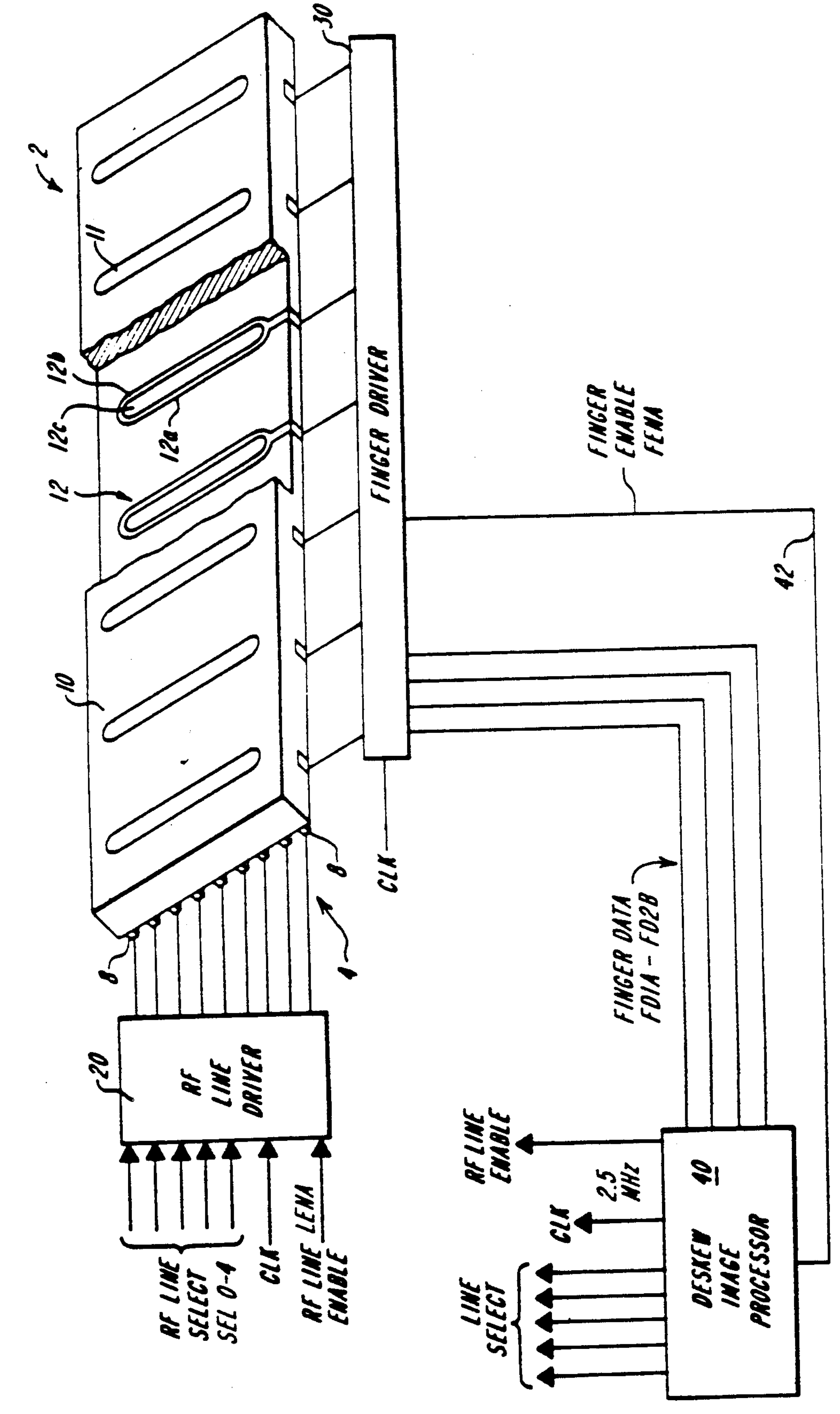
FIG. 1 (PRIOR ART)
FIG. 1 is a schematic illustration of a prior art printing system.

FIG. 1 shows by way of background a schematic representation of a prior art electrographic latent imaging unit 1 including a controllable printhead 2 having a plurality of first electrode sets 4 consisting of a plurality of individual inducer electrodes 8 which extend along the length of the printhead.

A front electrode plane 10, or individual screen electrodes of a type known in the art are biased in use to a voltage level which is intermediate the nominal RF line center voltage and the potential of the dielectric imaging drum or belt. A plurality of individual finger electrodes 12 are located at an intermediate level of the printhead between the RF inducer electrode lines 8 and the screen electrode 10. Each finger electrode is toggled between different voltages to gate charge carriers out of a corona region about an actuated RF line passing transversely below it.

Figure 1A:
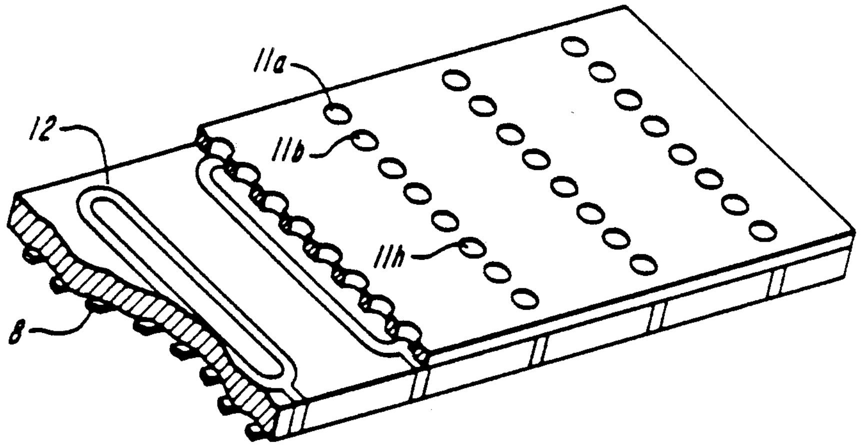
FIG. 1A is a partially cut away perspective view of a prior art printhead illustrating electrode geometry.

The illustrated finger electrode 12 have parallel conductive arms or tines 12*a*, 12*b* each straddling a central slot 12*c*. An aperture which is shown as a slot opening 11 in the screen electrode 10 and in the intermediate insulating layer of the printhead is aligned over each slot 12*c* and extends down into the finger electrode 12. In an alternative embodiment illustrated in FIG. 1(A) a plurality of small holes 11*a*, 11*b*. . . 11*h*. . . are aligned over each crossing of the RF electrodes 8, with each hole defining the position corresponding to one charge dot. The fingers are oriented obliquely to the RF lines, so that the nominal dot spacing achieved in this manner is equal to the pitch of the finger electrodes divided by the number of RF lines. Since dots with different horizontal offsets are generated by different RF electrodes, complex image encoding and timing control are necessary to activate the different electrodes in an appropriate order to print a correct image.

An RF line driver 20 consisting of a high voltage RF signal generator and switching circuitry connected to each line 8 provides the corona generation power to each of the RF lines 8. Finally, a finger driver circuit 30 consisting of an intermediate gate voltage power supply and corresponding multi-line power switching circuitry is connected to the finger electrodes for toggling the finger electrodes between a back-biased, or finger enabled, state and a level-biased or finger disabled, state. Finger driver 30 provides timed bias voltage signals to each of the 128 finger electrodes.

Each of the drivers 20, 30 receives corresponding electrode selection, timing and/or enable signals from a deskew board 40 which provides synchronizing, line selection and enable signals to effect the particular order and timing offset of the various electrode driving signals necessary to compensate for the oblique block electrode geometry of the printhead, to print geometrically correct images. The driver circuits also receive a 2.5 MHz system clock signal which is used to coordinate various internal circuit steps of switching, latching and shifting data.

Figure 2:
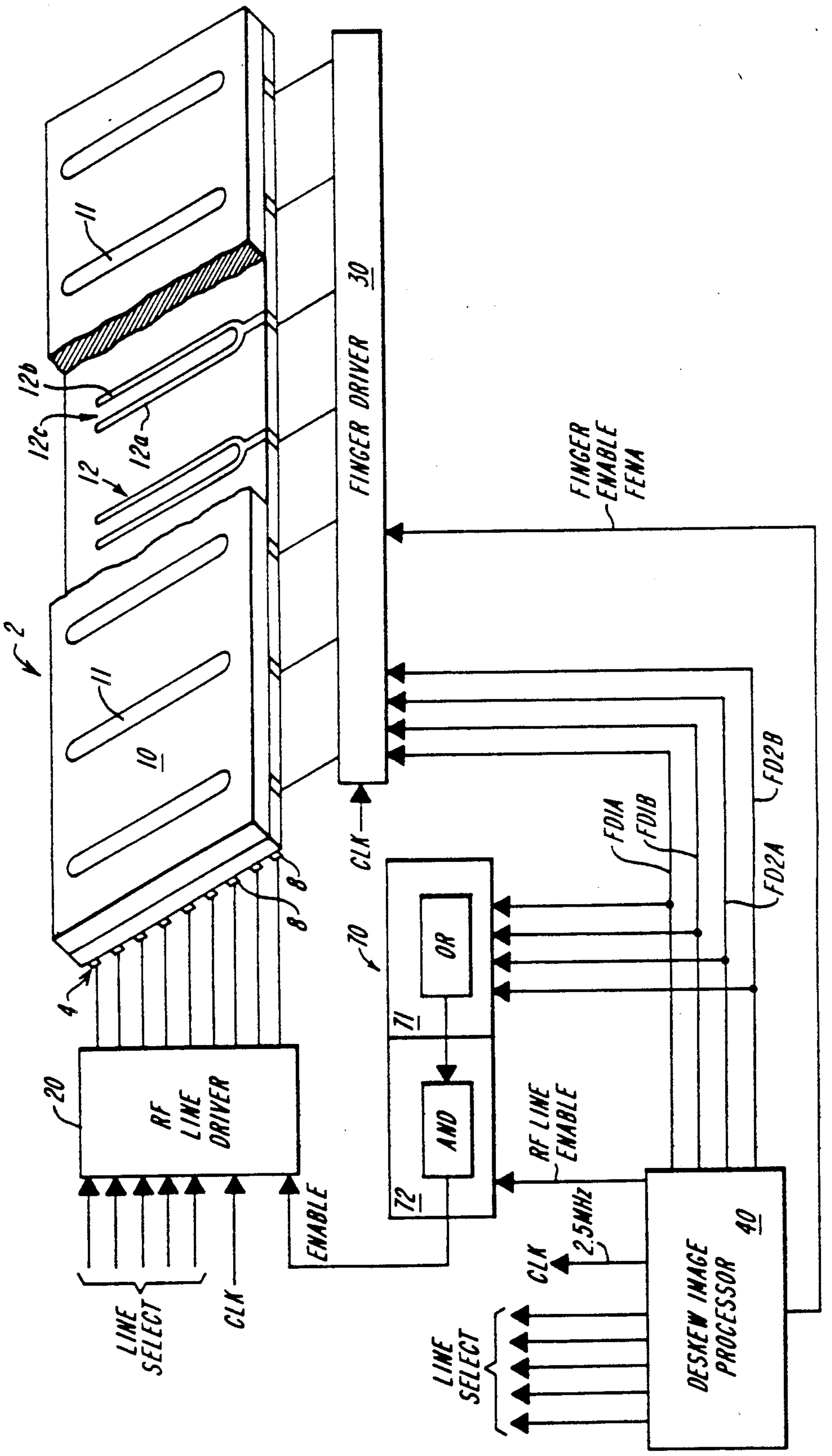
FIG. 2 shows one embodiment of a printing system in accordance with the present invention.

FIG. 2 illustrates a printhead controller in accordance with the present invention. In this embodiment, the printhead 2 and various prior art drive and control elements 20, 30, 40 are numbered identically to those of FIG. 1 for clarity of exposition. In additional, a circuit 70, which may be briefly characterized as a dot anticipation or RF line inhibition circuit, receives the finger enable and RF line enable signals from the deskew board 40, and controls the actuation of the RF line driver 20 in such a way that an RF line is not actuated when none of the finger electrodes has been enabled to print. The circuit 70 may be implemented as a logic unit 71 which produces an output corresponding to the logical OR of the finger enable signals, and a gate 72 which may include an AND gate, that is operated by the output of unit 71 to pass the RF line enable signal to the driver circuit 20.

Circuit 70 receives the finger actuation data for each RF line one or more printhead operating cycles before the line is to be actuated, and thus acts as a "dot anticipator" in determining whether any dots are to be printed on the forthcoming line. In the event no finger data line is driven high, the RF enable line gate 72 is not switched and the RF enable signal when it appears, is not passed to the RF line driver 20. In this sense, RF line control circuit 70 is an RF line inhibitor.

Figure 3:
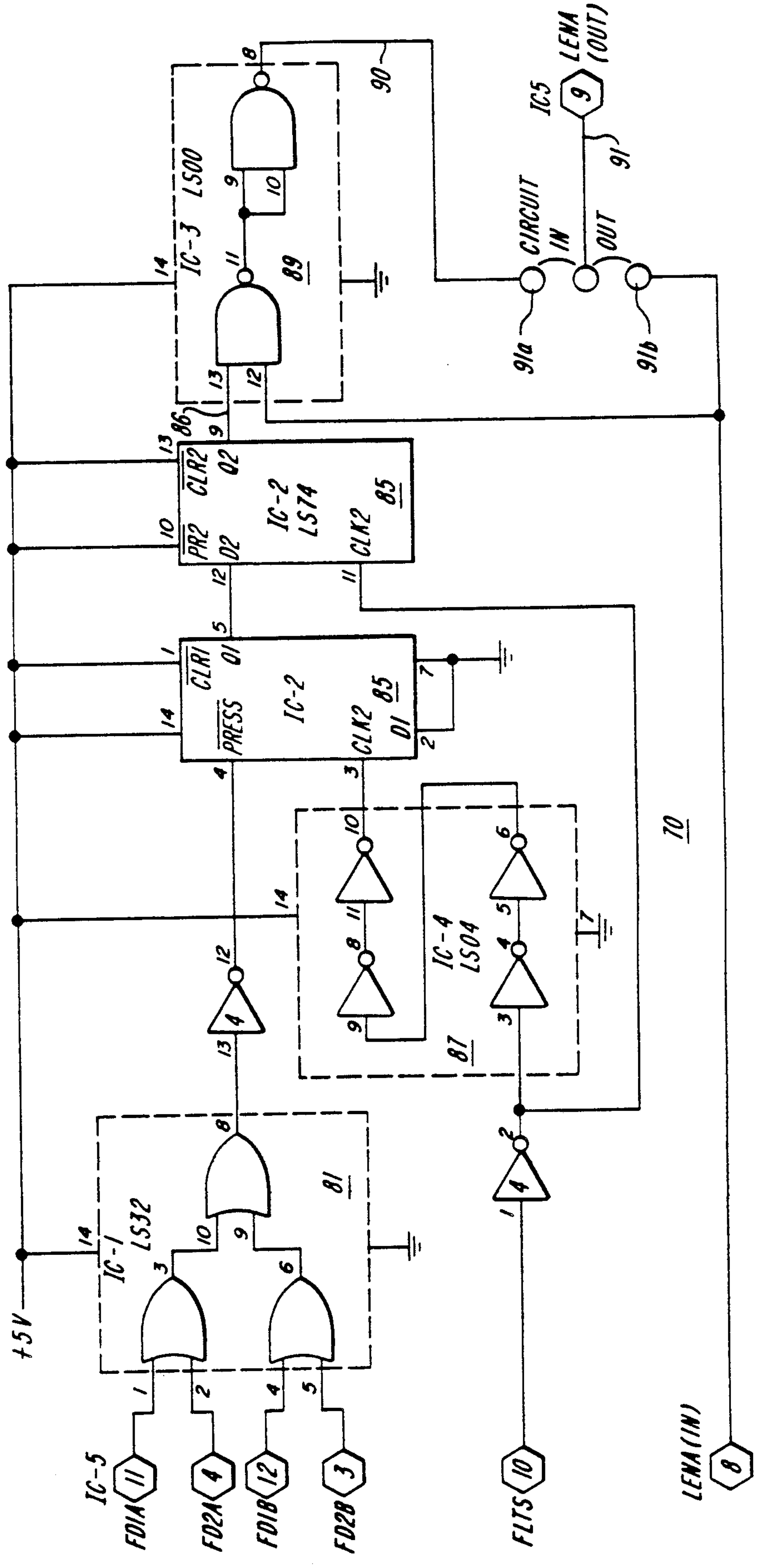
FIG. 3 is a schematic diagram of an electrode controller circuit suitable for the embodiment of FIG. 2.
Figure 4:
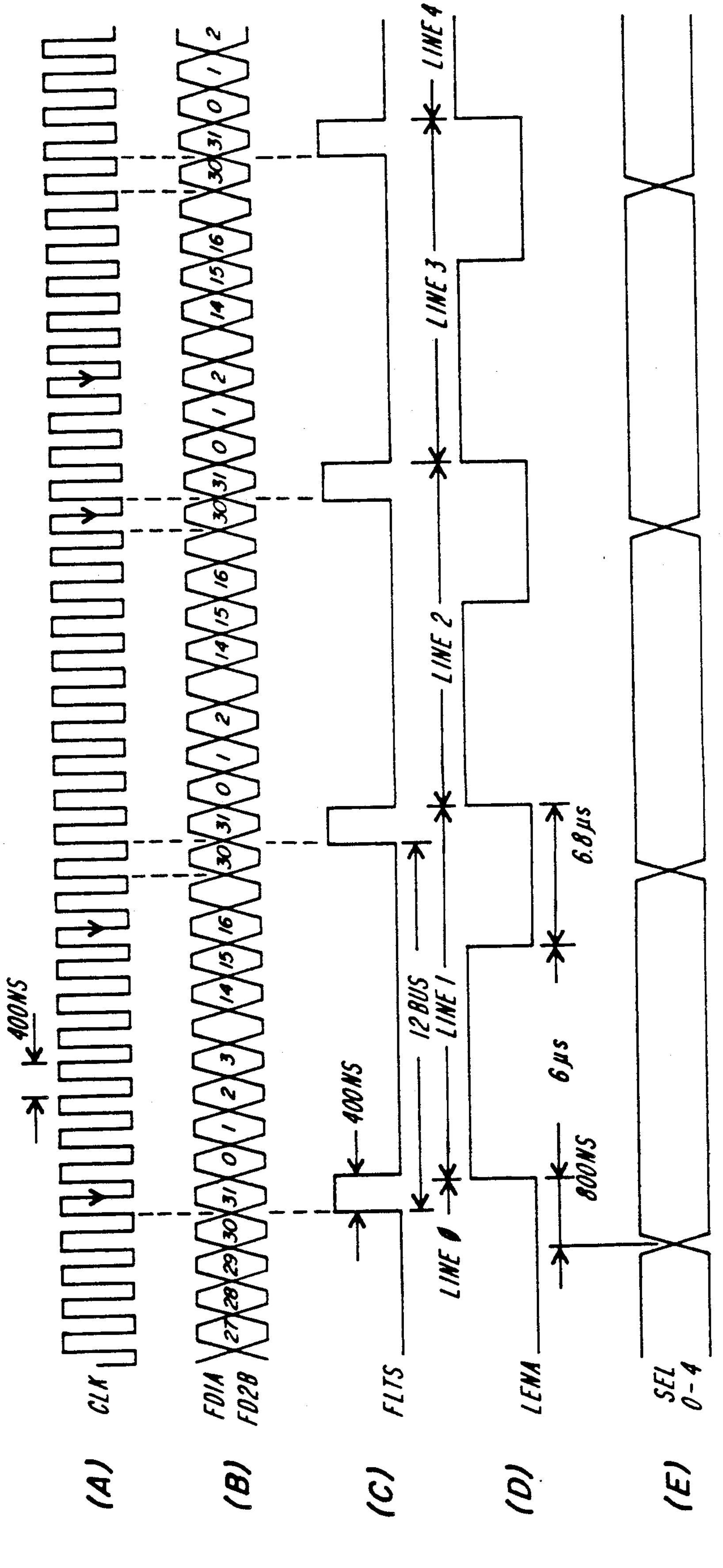
FIG. 4 shows representative signal timing.

By way of example, operation of the RF line inhibitor 70 will be discussed with reference to a particular circuit shown in FIG. 3, with illustrative timing and enable signals shown in FIG. 4 A system clock operating at 2.5 MHz illustrated in line (A) of FIG. 4, is assumed and corresponds to the clock employed for timing functions in a conventional 300 dot per inch resolution printhead operating with 1.35 MHz RF signal burst of approximately six microseconds duration. Prior to firing of an RF electrode, four finger data information lines FD1A . . . FD2B each provide thirty two bits of information as serial data signals in successive clock cycles (line (B)) to specify the state of each of the one hundred twenty eight finger electrodes. A finger data latch signal FLTS, line (C), synchronizes the loading of a full thirty-two bits of finger state data into each of four thirty-two line driver chips of the finger driver unit 30. Similarly, five parallel lines provide RF line select signals SEL 0–4 (line (E)) to specify a five bit word to select one of the twenty RF electrode lines for actuation, and an RF line enable signal LENA (line (D)) triggers the application of the high voltage RF signal to the line designated by the data signals SEL 0–4. Reference is made to U.S. Pat. No. 4,841,313 of Nathan K. Weiner for a detailed description of a suitable circuit for applying the RF drive signals to the printhead. The foregoing are the essential signals provided by the deskew board 40 to control operation of the RF line driver 20 and finger driver 30 of FIG. 1.

The dot anticipation circuit 70 in parallel to the finger driver 30, receives the four finger data lines FD1A . . . FD2B as inputs to an integrated circuit gate array 81 configured as a four input OR gate, the inverted output of which passes to flip flop 83. The inverted finger latch signal FLTS passes to a second flip flop 85, and via a delay line 87 to the flip flop 83 as its clock signal so that the OR'd finger output is clocked through flip flops 83, 85 along line 86 to output gate 89.

In addition to the OR'd finger data signals, output gate 89 receives the line enable signal LENA (line (D), FIG. 4). This causes an output at terminal 91*a* only when a non-zero finger data signal has been latched for at least one of the fingers for the data loading interval corresponding to that RF line actuation cycle. Thus, output line 91 is connected to receive the signal at terminal 91*a* and pass it along to the RF driver board in place of the original line enable signal from the board. In this fashion, the LENA signal passes to the RF line driver if and only if the finger data signals command the actuation of at least one finger electrode for the RF line actuation cycle.

It will be appreciated that the invention has been described in connection with the operation of a particular prior art device, in which the finger data for four thirty-two pin finger driver chips are conveyed along four parallel lines. In other embodiments the printhead may be operated by different numbers of finger data bits delivered in serial or parallel along a different number of lines. In such cases the finger data signals may be stored or processed by different arrangements of logic gates and registers to develop the required line enabling output signals. Furthermore, the dot anticipator circuitry need not be adapted to prior art boards, but may include the required logic and switching functions integrally on an electrode drive board which includes the power supply or power switching components for a set of electrodes. The precise timing of each of the signals involved will further vary with different printhead driving and control circuits. What is important is that the circuit determine whether the RF electrode is to generate any dots, and that it disable the RF line in the case that no dots are to be activated.

The foregoing description of one exemplary embodiment is intended to illustrate both the principal of the invention, and its practical application to a device, but is not intended to restrict or limit the scope of the invention. Armed with the illustrative teaching of this disclosure, variations, modifications and adaptations to other forms of printer and drive circuitry will occur to those skilled in the art, and all such variations, modifications and adaptations are considered to be included in the invention, as defined by the claims appended hereto.

What is claimed is:

1. A printhead assembly comprising
   a printhead having any array of mutually spaced first and second electrode sets, each electrode of the first set crossing plural electrodes of the second set,
   control means for actuating an electrode of the first set together with a selected group of electrodes of the second set at locations corresponding to desired image points, and
   means for inhibiting actuating of the electrode of the first set when no electrodes of the second set correspond to desired image points.

2. An improved printhead drive controller for driving an electrographic printhead of the type having first and second sets of electrodes constituting an array of charge deposition loci defined by crossings of electrodes of said first and second sets, the electrodes of said first set being linearly extending electrodes which are energized at an energy to constitute sources of charge carriers and the electrodes of said second set extending transversely thereto and being energized with a control signal to selectively gate charge carriers from the sources to a recording member, such imProved printhead drive controller comprising
   first means for receiving a set of actuation signals corresponding to electrodes of the second set and determining whether at least one electrode of the second set is to be energized for gating charge carriers from the sources constituted by an electrode of the first set, and
   second means for inhibiting energizing the electrode of the first set when the first means determines that no electrode of the second set is to be energized.

3. The improved printhead drive controller of claim 2, wherein said first means comprises a plurality of logic gates which receive as inputs selection signals for selecting ones of said second electrodes and which develop an output signal therefrom, and said second means includes an AND gate which receives as inputs said output signal and an RF line enable signal to develop an RF output control signal, said RF output control signal being operative to energize the RF line.

4. A method of prolonging the lifetime of an ionographic printing apparatus of the type having a printhead wherein a high voltage RF signal is successively and repetitively applied to a plurality of drive lines to generate charge carriers at crossing points with a second set of crossing electrodes, the crossing points corresponding to image points, such method comprising the step of preventing application of the high voltage RF signal to a drive line when no crossing points of the drive line correspond to image points.

5. A printhead assembly having improved lifetime, such assembly comprising
   a printhead having an array of mutually spaced first and second electrode sets, each electrode of the first set crossing plural electrodes of the second set
   control means for providing synchronized signals to actuate one electrode of the first set together with a selected group of electrodes of the second set, the selected group having crossing points corresponding to desired image points, said control means including plural high voltage switching elements for actuating ones of the electrodes of the first set, and having a characteristic lifetime, and
   means for preventing actuation of electrodes of the first set when no electrodes of the second set have crossing points corresponding to desired image points, thereby decreasing the number of switching cycles of said control means and increasing said lifetime.

6. A printhead assembly having improved lifetime, such assembly comprising
   a printhead having an array of mutually spaced first and second electrode sets, each electrode of the first set crossing plural electrodes of the second set
   control means for providing synchronized signals to actuate one electrode of the first set together with a selected group of electrodes of the second set, the selected group having crossing points corresponding to desired image points, said control means including plural high voltage switching elements for actuating ones of the electrodes of the first set, and the printhead being subject to aging as a result of such actuating and having a characteristic lifetime, and
   means for preventing actuation of electrodes of the first set when no electrodes of the second set have crossing points corresponding to desired image points, thereby decreasing the number of actuations of said first electrodes and increasing said lifetime.

* * * * *